(12) United States Patent
Madsen et al.

(10) Patent No.: US 8,721,316 B2
(45) Date of Patent: May 13, 2014

(54) AUTOMATED MATERIAL DELIVERY SYSTEM

(75) Inventors: Christopher J. Madsen, Ogden, UT (US); Kyle E. Chapman, Layton, UT (US); Boyd L. Hatch, West Valley City, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 13/359,289

(22) Filed: Jan. 26, 2012

(65) Prior Publication Data

US 2013/0193607 A1    Aug. 1, 2013

(51) Int. Cl.
*B28B 1/48* (2006.01)

(52) U.S. Cl.
USPC .......................................................... 425/296

(58) Field of Classification Search
USPC .......................................... 264/257; 425/256
See application file for complete search history.

(56) References Cited

U.S. PATENT DOCUMENTS

| | | | |
|---|---|---|---|
| 7,249,943 B2 | 7/2007 | Benson et al. | |
| 7,469,735 B2 | 12/2008 | Brown et al. | |
| 7,731,816 B2 | 6/2010 | Oldani et al. | |
| 7,820,092 B2 | 10/2010 | Benson et al. | |
| 7,841,375 B2 | 11/2010 | Rindels | |
| 7,879,177 B2 | 2/2011 | McCowin et al. | |
| 7,993,480 B2 | 8/2011 | Anderson et al. | |
| 8,003,034 B2 | 8/2011 | Oldani et al. | |
| 8,012,291 B2 | 9/2011 | Kisch et al. | |
| 8,048,261 B2 | 11/2011 | McCowin | |
| 2009/0078361 A1 | 3/2009 | Kisch et al. | |
| 2009/0095410 A1 | 4/2009 | Oldani | |
| 2009/0130450 A1 | 5/2009 | Anderson et al. | |
| 2011/0192545 A1 | 8/2011 | McCowin et al. | |
| 2011/0247743 A1* | 10/2011 | Slack et al. | 156/64 |

FOREIGN PATENT DOCUMENTS

WO    WO 2005/105641 A2    11/2005

* cited by examiner

*Primary Examiner* — Larry Thrower
(74) *Attorney, Agent, or Firm* — IPLM Group, P.A.

(57) ABSTRACT

An automated material delivery system including a material handling assembly, a compaction member, a handling actuator, and a cutting actuator is provided. The material handling assembly is configured and arranged to guide material. The material handling assembly includes a tacking member that is configured and arranged to selectively press the material over a forming surface of a tool. The compaction member is spaced a select distance from the tacking member. The compaction member is further configured to selectively press the material over at least a portion of the forming surface of the tool. The handling actuator is coupled to selectively move at least one of the material handling assembly and the compaction member to move the material handling assembly in relation to the compaction member. The cutting assembly is positioned between the tacking member and the compaction member. The cutting assembly is configured and arranged to selectively cut the material.

16 Claims, 8 Drawing Sheets

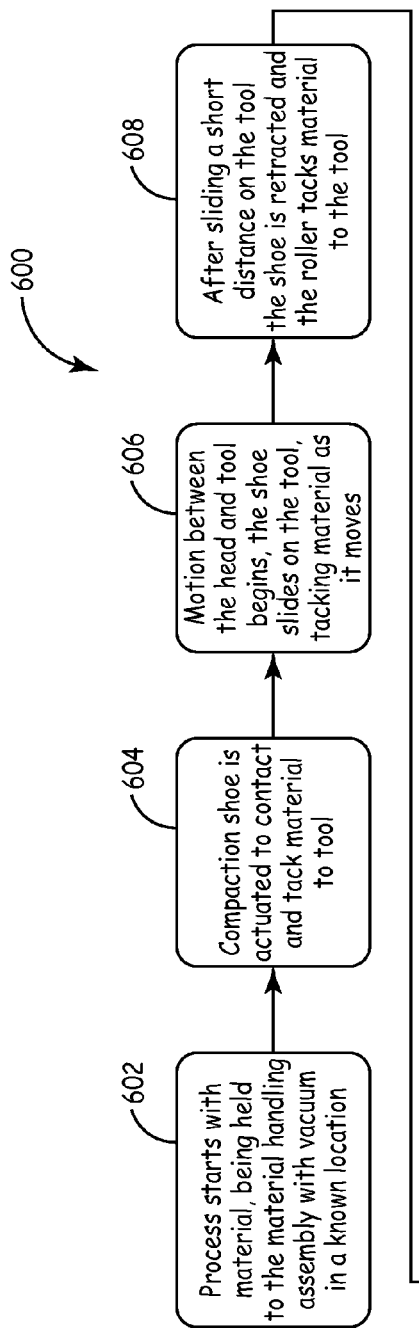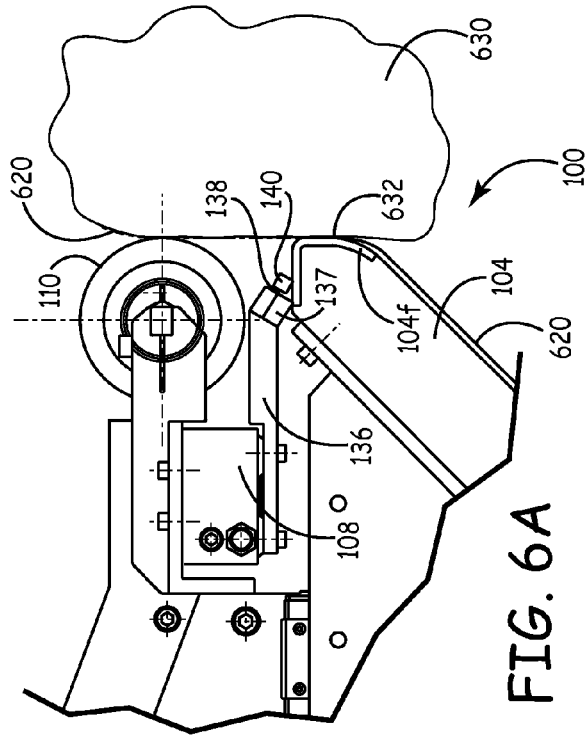

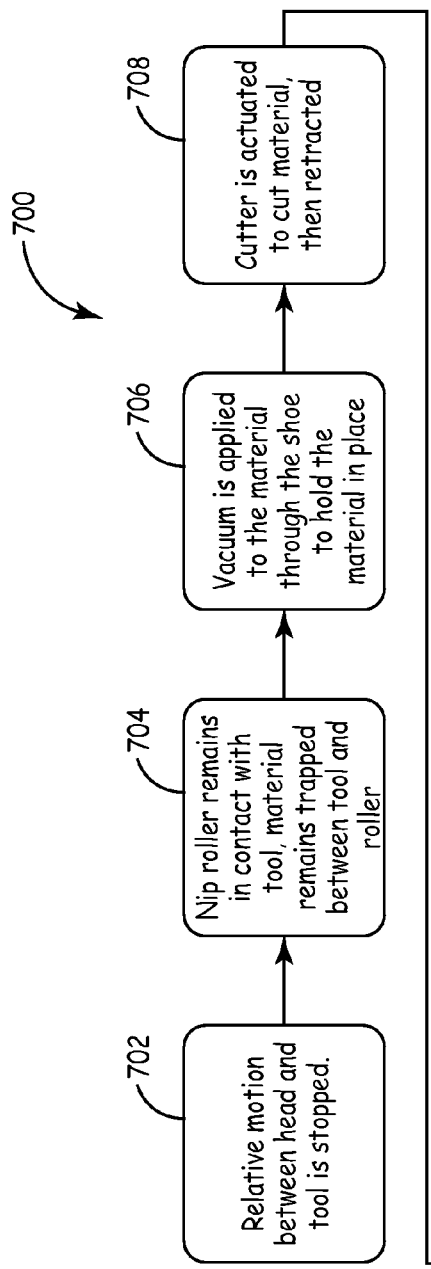
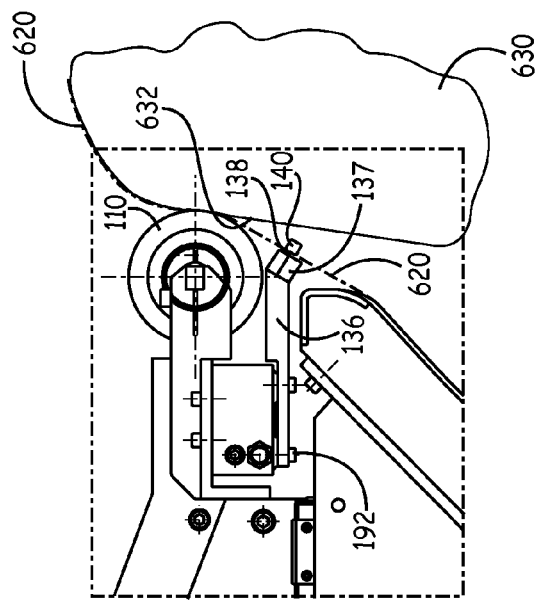
FIG. 7A
FIG. 7B

AUTOMATED MATERIAL DELIVERY SYSTEM

BACKGROUND

Composite structures formed from pre-impregnated (pre-preg) material are used in the formation of high strength-low weight structures such as, but not limited to, parts used to build aircraft and spacecraft. Pre-preg material is made of composite fibers such as carbon, glass, aramid and the like, that are bonded together with a resin that is activated with heat to cure. The pre-preg material is typically supplied in sheets or plies having the fibers oriented in a select direction. The manufacturer then forms stacks of plies of pre-preg material on a forming surface of a tool having a desired shape. Once the pre-preg material is formed on the tool, the tool is typically placed in an autoclave or conventional oven to cure the resin thereby forming a composite structure. Any imperfection in the pre-preg that occurs during the forming process weakens the formed composite structure. Moreover, it is difficult to avoid imperfections when the forming surface is in a complex shape such as a curve.

For the reasons stated above and for other reasons stated below which will become apparent to those skilled in the art upon reading and understanding the present specification, there is a need in the art for an application head that applies pre-preg on complex forming surfaces of tools without imperfections.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an automated material delivery system is provided. The system includes a material handling assembly, a compaction member, a handling actuator, and a cutting actuator. The material handling assembly is configured and arranged to guide material. The material handling assembly includes a tacking member that is configured and arranged to selectively press the material over a forming surface of a tool. The compaction member is spaced a select distance from the tacking member. The compaction member is further configured to selectively press the material over at least a portion of the forming surface of the tool. The handling actuator is coupled to selectively move at least one of the material handling assembly and the compaction member to therein move the material handling assembly in relation to the compaction member. The cutting assembly is positioned between the tacking member and the compaction member. The cutting assembly is configured and arranged to selectively cut the material.

In another embodiment, a material placement assembly is provided. The material placement assembly includes a material handling assembly base frame, a material spool holder, a material handling assembly, the compaction shoe, a nip roller frame, a nip roller, a handling assembly actuator, a cutting assembly, a cutting actuator, a controller and a placement system. The material spool holder is configured and arranged to hold a spool of material. The material spool holder is coupled to the material handling assembly base frame. The material handling assembly is coupled to the material handling assembly base frame. The compaction shoe is coupled to the material handling assembly. The nip roller frame is movably coupled to the material handling assembly base frame. The nip roller is coupled to the nip roller frame and is positioned a select distance from the compaction shoe. The handling assembly actuator is configured and arranged to selectively move the material handling assembly base frame in relation to the nip roller frame to selectively move the compaction shoe in relation to the nip roller. The cutting assembly is coupled to the nip roller frame proximate the nip roller. The cutting actuator is configured and arranged to selectively activate the cutting assembly to cut material positioned between the compaction shoe and the nip roller. The controller is in communication with the handling assembly actuator and the cutting actuator to selectively control the handling assembly actuator and the cutting actuator. The placement system positions the material handling assembly base frame and the nip roller frame in a desired location in relation to a tool.

In yet another embodiment, a method of forming a composite structure is provided. The method includes: positioning an automated material delivery system in relation to a forming surface of a tool; engaging material to tack the material over the forming surface of the tool with a tacking member coupled to the automated material delivery system; moving at least one of the automated material delivery system and the tool to move the automated material holder in relation to the tool thereby placing the material over the surface of the tool; compacting the material on the tool with a compaction member that is coupled to the automated material delivery system a select distance from the tacking member; moving the tacking member away from the forming surface of the tool after the compaction member engages the material and once a select length of material has been laid out on the tool, cutting the material.

BRIEF DESCRIPTION OF THE DRAWINGS

The present invention can be more easily understood and further advantages and uses thereof will be more readily apparent, when considered in view of the detailed description and the following figures in which:

FIG. 6A is a partial side view of the material delivery system of FIG. 1 in use;

FIG. 6B is a start flow diagram of the material delivery system in FIG. 6A in use;

FIG. 7A is another side view of the material delivery system of FIG. 1 in use;

FIG. 7B is a cutting flow diagram of the material delivery system in FIG. 7A in use.

In accordance with common practice, the various described features are not drawn to scale but are drawn to

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a material delivery system that delivers layers of pre-preg material on a forming surface of a tool or mandrel to make a laminate. Automated Tape Laying (ATL) machines are currently used in the industry to deliver pre-preg material. The ATL machines achieve relatively high precision location positioning by carrying the pre-preg on a stiff paper backing using an unwind/rewind system to control the edge of each ply applied to the forming surface of a tool. However, in many manufacturing applications, there is a need to allow the pre-preg material to conform to a forming surface of a tool that has a complex (compound) curvature. To accomplish this, the pre-preg material may be adhered to a flexible backing material. However, the flexible backing is difficult to handle in an ATL reel system because the flexible backing material stretches causing location positioning to be compromised. In addition, when it is desired to cut the pre-preg material about the complex shape of the forming surface, Automated Fiber Placement (AFP) is difficult since the AFP pushes the material a short distance to restart the application of the pre-preg material on the forming surface. When pushed, the flexible backing is prone to buckling Embodiments of the present invention provide a material delivery system that accurately and repeatedly places compliant backed material on a forming surface of a tool without a reel system or the buckling problems discussed above. The embodiments are simpler to implement, and less expensive to fabricate and to install, than traditional AFP and ATL heads.

Figure 1:
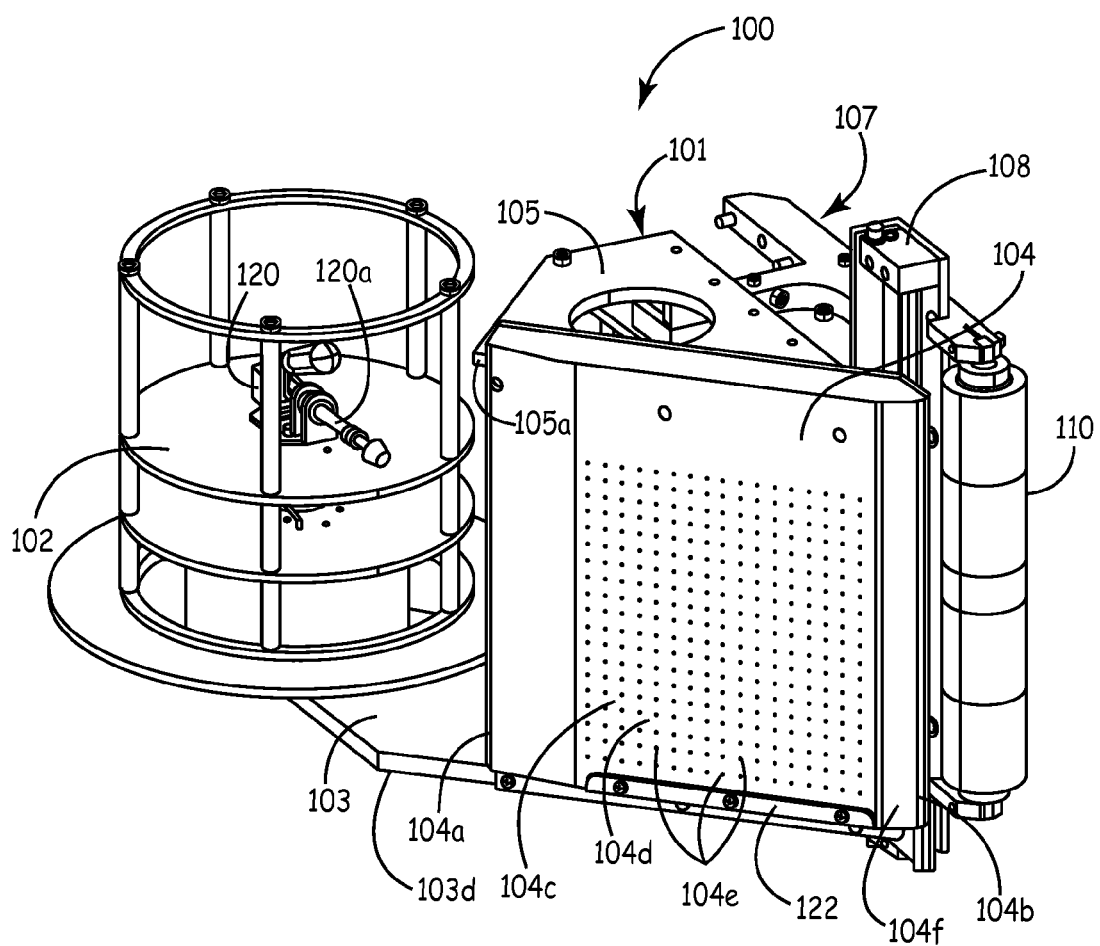
FIG. 1 is a first side perspective view of a material delivery system of one embodiment of the present invention.

As discussed above, embodiments of the present invention provide an automated material delivery system 100 that delivers material on a forming surface. In one embodiment, the material includes a compliant backing (flexible backing). In yet another embodiment the material is compliant backed composite material. Other types of material are contemplated and the present invention is not limited to a material delivery system that only supplies compliant backed composite material. System 100 eliminates the need to push and pull material during an add (ply start) and cut (ply end) process. In the embodiment of FIG. 1, the system 100 includes a material spool holder 102 designed to hold a spool of material such as a spool of pre-preg material that includes a compliant backing. In use, a spool of pre-preg material (not shown) is mounted around the material spool holder 102. The material spool holder 102 includes a spool tension assembly 120 with an engaging rod 120a. The spool tension assembly 120 extends the engaging rod 120a to contact an inner surface of the spool holder of pre-preg material thereby creating friction, which in turn, provides tension on the pre-preg material being unwound from the spool.

The system 100 further includes a delivery shoe 104. The delivery shoe 104 can be generally referred to as a material handling assembly 104. The material handling assembly 104 in this embodiment has a first end 104a and a second end 104b. In between the first end 104a and the second end 104b is a guiding portion 104c. The guiding portion 104c in this embodiment includes a guide surface 104d having vacuum ports 104e. A vacuum (not shown) selectively provides a vacuum force through the ports 104e to aid in holding and positioning the pre-preg material along the material handling assembly 104. In particular, the selective vacuum through the vacuum ports 104e causes the compliant backing of the pre-preg material to selectively engage guide surface 104d of the delivery shoe 104. In the embodiment of FIG. 1, a material guide 122 is attached to the guide surface 104d to further provide a guide for the pre-preg material. In this embodiment, an edge of the pre-preg material (not shown) abuts the material guide 122 to guide the pre-preg material and compliant backing. At the second end 104b of the material handling assembly 104 is a compaction shoe 104f that is designed to tack the compliant backing and pre-preg material on a forming surface of a tool or mandrel (not shown in FIG. 1). The compaction shoe 104f can be referred to generally as a tacking member 104f. The material handling assembly 104 is coupled to a material handling assembly base frame 101 that includes a first side panel 105 and a spaced second side panel 103. In particular, the material handling assembly 104 is coupled to a first edge 105a of the first side panel and a first edge 103d of the second side panel 103. In the embodiment of FIG. 1, the material spool holder 102 is coupled to the second side panel 103 of the material handling assembly base frame 101.

Figure 2:
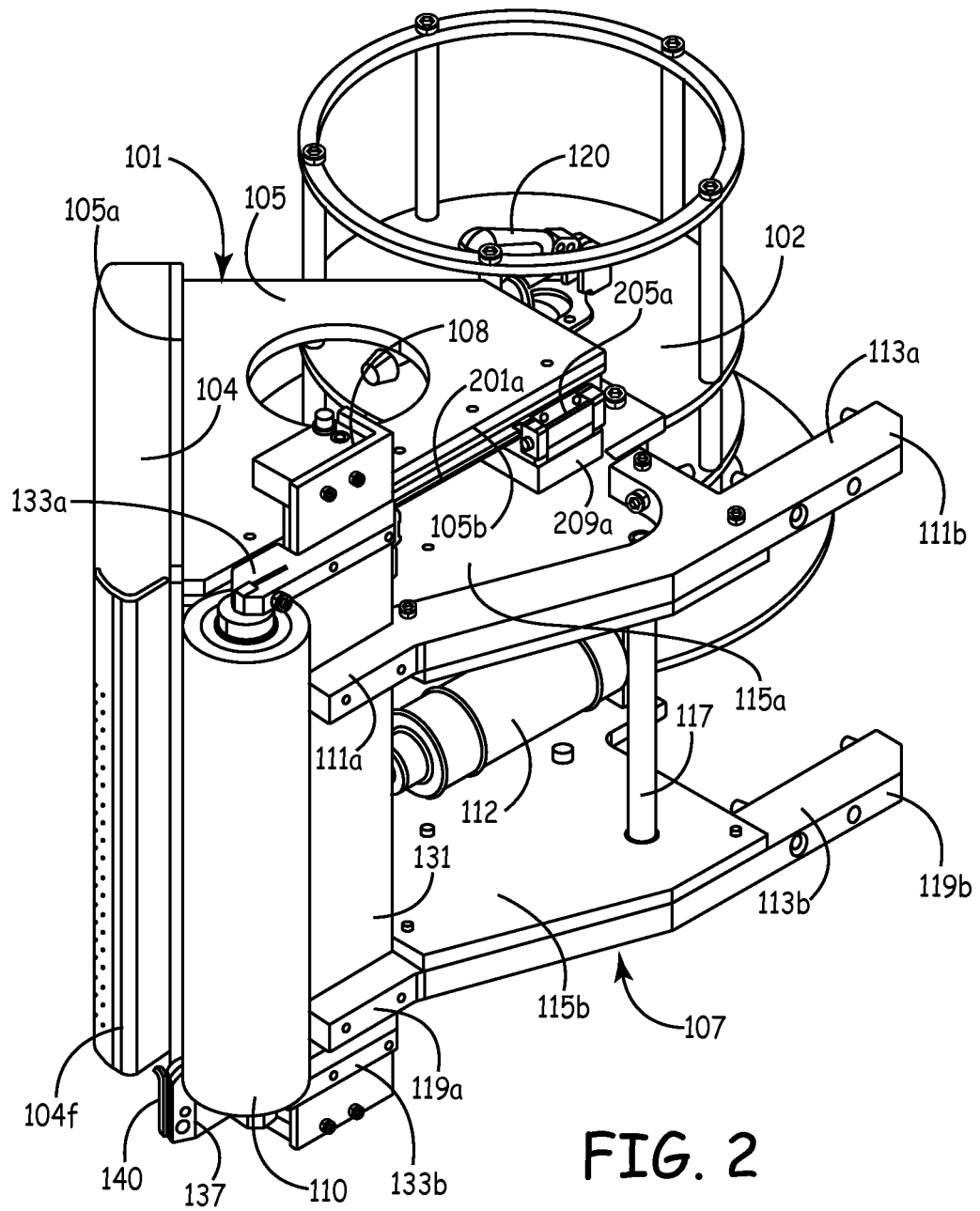
FIG. 2 is a second side perspective view of the material delivery system of FIG. 1.

The compliant backed composition material delivery system 100 further includes a nip roller 110. The nip roller 110 can generally be referred to as a compaction member 110. The nip roller 110 is coupled to a nip roller frame 107. The nip roller frame 107, as illustrated in FIG. 2, includes a pair of spaced frame arms 113a and 113b and a holding bracket 131. The first arm 113a includes a first end 111a that is coupled to the holding bracket 131 and a second end 111b that is designed to be mounted to a placement system as discussed below. The second arm 113b also includes a first end 119a that is coupled to the holding bracket 131 and a second end 119b that is designed to be mounted to a placement system. The nip roller 110 is coupled to holding bracket 131 via spaced mounting plates 133a and 133b. A cutting assembly 108 is further coupled along a length of the holding bracket 131. The cutting assembly 108 is further discussed below. Nip roller frame 107 further includes, nip roller first and second side panels 115a and 115b and a spacer 117. Arm 113a is coupled proximate a first edge of the first side panel 115a. Arm 113b is coupled proximate a first edge of the second side panel 115b. Spacer 117 extends between the first side panel 115a and second side panel 115b.

The nip roller frame 107 is slidably connected to the material handling assembly base frame 101. In particular, a movement base block 209a is coupled to the first nip roller side panel 115a. Coupled to the base block 209a is a rail receiving assembly 205a. The rail receiving assembly 205a is designed to engage a rail 201a coupled to a second edge 105b of the first side panel 105 of the material handling assembly base frame 101. A similar arrangement slidably attaches the second nip roller side panel 103 of the nip roller frame 107 to the second side panel 103 of the material handling assembly base frame 101. For example, a base block 209b and rail receiving assembly 205b of this arrangement are shown in part in FIG. 4. Referring back to FIG. 2, a handling assembly actuator 112 is coupled to selectively move the material handling assembly base frame 101 in relation to the nip roller frame 107. In use, the handling assembly actuator 112 moves the handling assembly base frame 101 in relation to the nip roller frame 107 to selectively engage and compress the compliant backing of the pre-preg material with the compaction shoe 104f of the material handling assembly 104 onto the tool or mandrel. The handling assembly actuator 112 is in communication with a controller 502 (shown in FIG. 5 and further described below). The controller 502 directs the handling assembly actuator 112 to move the material handling assembly base frame 101 in relation to the nip roller frame 107.

Figure 3B:
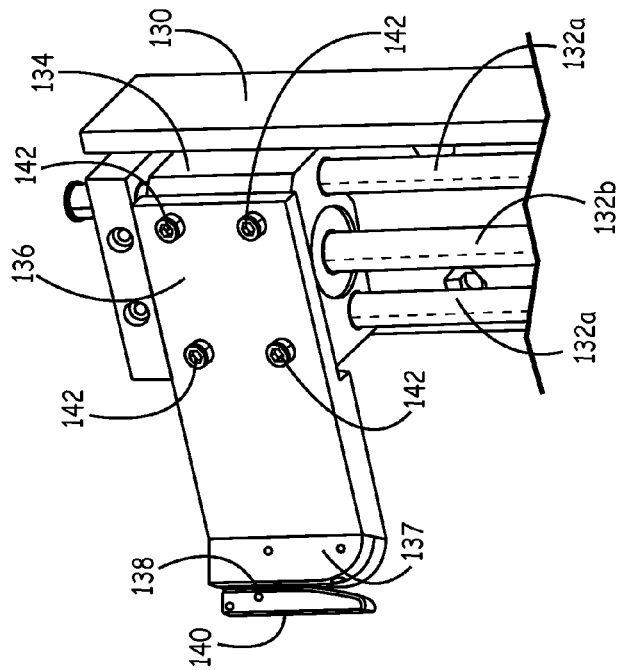
FIG. 3B is a partial close up first side perspective view of the cutter assembly of FIG. 3A.
Figure 3A:
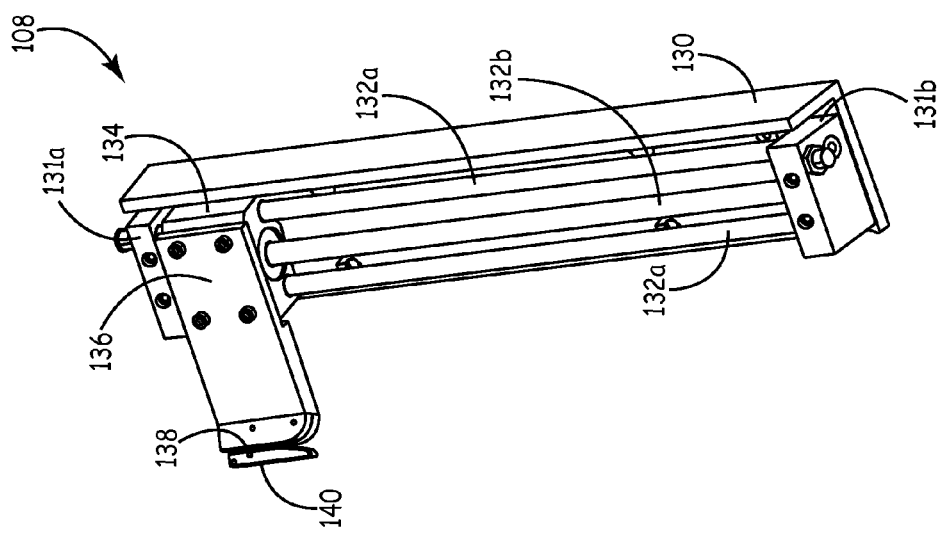
FIG. 3A is a first side perspective view of a cutter assembly of one embodiment of the present invention.

The nip roller 110 is positioned a select distance from the compaction shoe 104f of the material handling assembly 104. Between the compaction shoe 104f and the nip roller 110 is the cutting assembly 108. As discussed above, cutting assembly 108 is coupled along a length of the holding bracket 131 of the nip roller frame 107. In use, the cutting assembly 108 is positioned to cut the pre-preg material when the compaction shoe 104f of the material handling assembly 104 is selectively retracted in relation to the nip roller 110. A close up back view of the cutting assembly 108 is illustrated in FIG. 3A. As illustrated in FIG. 3A, the cutting assembly 108 includes a cutter base 130. Coupled to opposing ends of the cutter base 130 are a first end member 131a and a second end member 131b. Coupled between first end member 131a and the second end member 131b is outer guide rod 132a and an inner guide rod 132b. A cutting actuator 134, in communication with the controller 502, moves the cutter 138 along a length of the cutter base 130 via the outer and inner guides 132a and 132b. Referring to FIG. 3B, a close up partial view of the cutting assembly 108 is provided to further illustrate the cutting assembly 108. Attached to the cutting actuator 134 is a first blade holding plate 136. The first blade holding plate 136 is coupled to the cutting actuator 134 with a plurality of fasteners 142. Extending from the first blade holding plate 136 is a second blade holding plate 137. In the embodiment of FIG. 3B, the second blade holding plate 137 extends at a select angle from the first holding plate 136. A blade material guide 140 is coupled to, an end of the second blade holding plate 137. The blade material guide 140 is designed to direct material to be cut into the blade 138 which is positioned between the blade material guide 140 and the second blade holding plate 137. Although, the cutting assembly 108 above is described as implementing a blade or drag knife configuration, any type of cutting assembly can be used, such as but not limited to, ultra-sonic cutting assemblies and rotating cutting assemblies.

Figure 4:
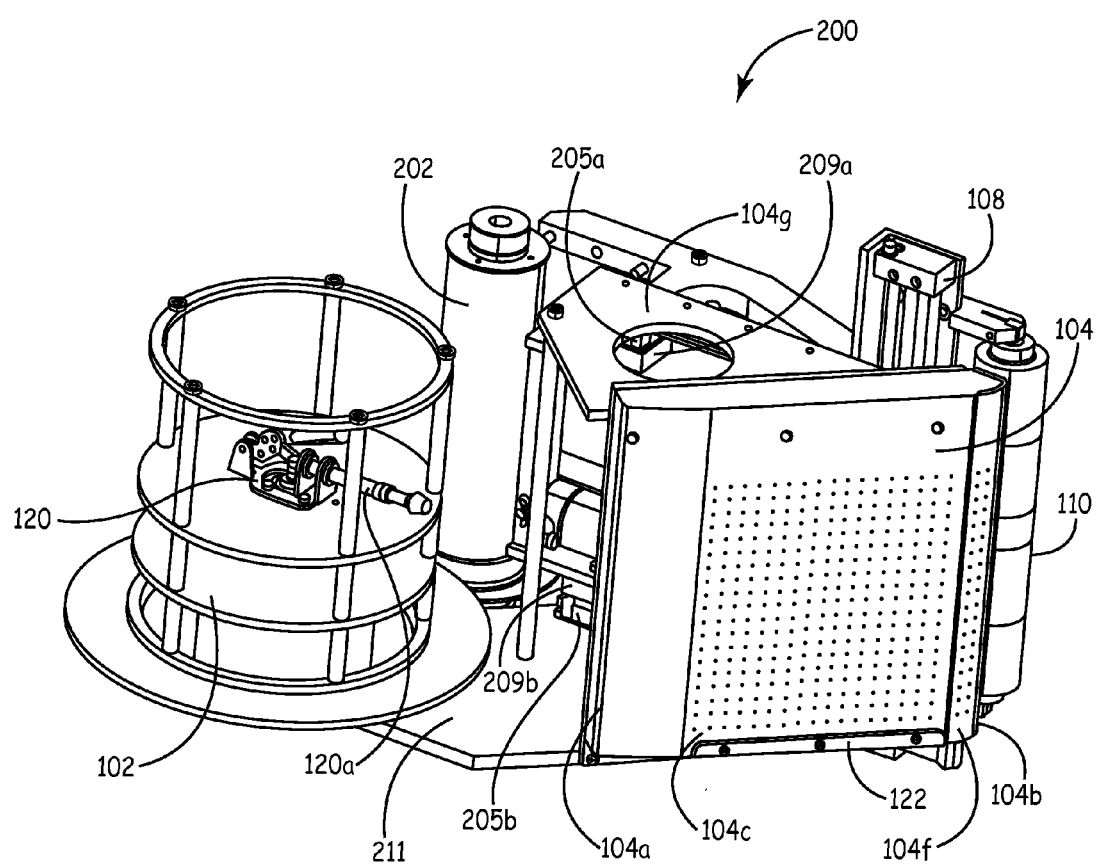
FIG. 4 is a first side perspective view of a material delivery system including a take up spool of another embodiment of the present invention.

Another embodiment of an automated material delivery system 200 is illustrated in FIG. 4. This embodiment is similar to the embodiment of FIG. 1 in that this embodiment also includes a material spool holder 120, a material handling assembly base frame with a material handling assembly 104 and a nip roller frame with a nip roller 110 and cutter assembly 108. However, in this embodiment of the automated material delivery system 200, a carrier roll-up spool 202 is included. The carrier roll-up spool 202 collects the carrier material from the pre-preg material after the pre-preg material has been compressed on the mandrel or tool. In one embodiment the carrier roll-up spool 202 collects the carrier material after the nip roller 110 has compacted the pre-preg material on the mandrel or tool.

Figure 5:
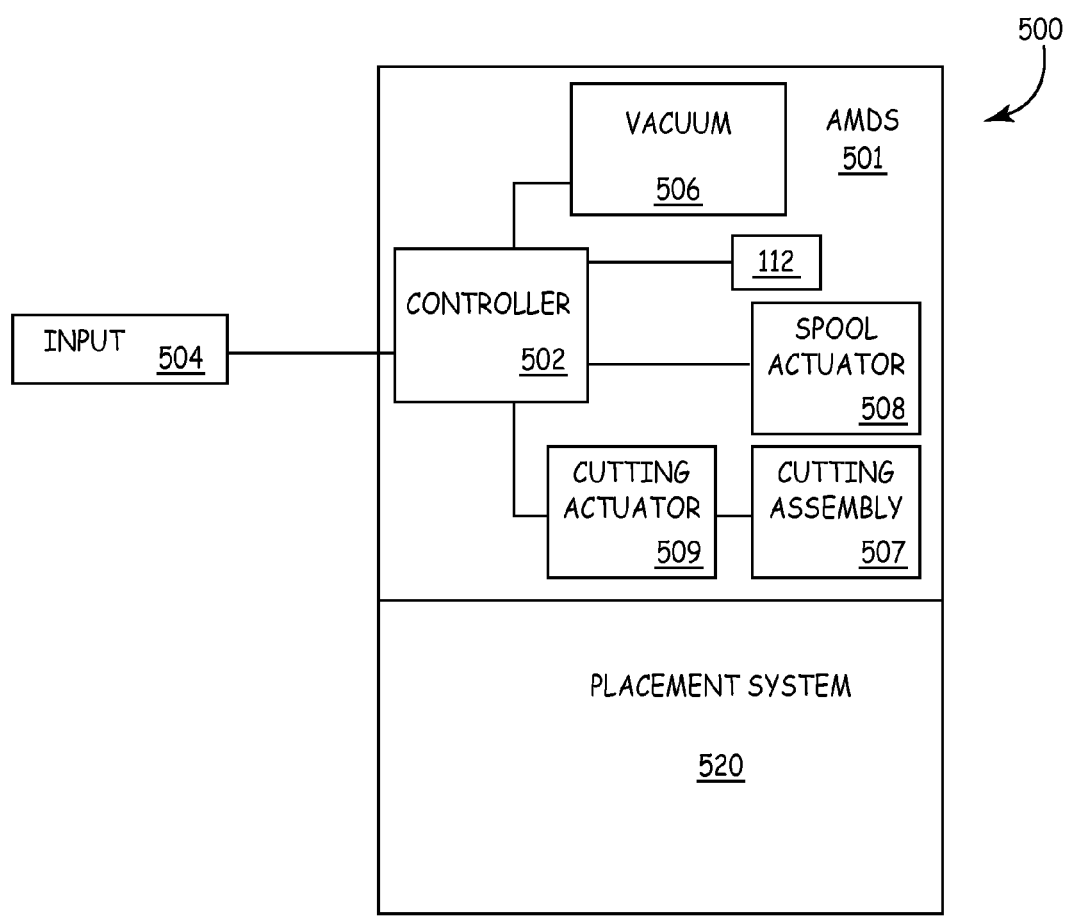
FIG. 5 is a block diagram of a material placement assembly of one embodiment of the present invention.

A block diagram of a material placement assembly 500 that includes an automated material delivery system 501 (similar to the automated material delivery systems 100 and 200 discussed above) is illustrated in FIG. 5. As illustrated, the automated material delivery system 501 includes a controller 502 that is in communication with the material handling assembly actuator 112, a cutting actuator 509, a spool actuator 508 and vacuum 506. An input 504 is further illustrated in communication with the controller 502. The input 504 provides a port for the operator to provide instructions to the controller 502. The controller 502, via the communications with the material handling assembly actuator 112 and the cutting actuator 509, controls the material handling assembly actuator 112 and the cutting actuator 509. Cutting assembly 507 is coupled to operate via the cutting actuator 509. In this embodiment, the cutting assembly may be any type of cutting assembly such as, but not limited to, a drag knife assembly described above, an ultra-sonic cutting assembly, a rotating cutting assembly or any other type of cutting assembly. The controller 502 is also illustrated in the embodiment of FIG. 5 as being in communication with the vacuum 506. The controller 502 controls the vacuum 506 to selectively provide a vacuum through the vacuum ports 104e of the material handling assembly 104 to selectively hold the material in place. Hence, the vacuum 506 is in fluid communication with the vacuum ports 104e of the material handling assembly 104. Also included in this embodiment is a spool actuator 508 that is designed to selectively rotate the carrier roll-up spool 202. FIG. 5 further illustrates a placement system 520. The placement system 520 is coupled to position the handling assembly system 100 in relation to a tool or mandrel 630 (a portion of a tool or mandrel is illustrated in FIG. 7A) in direction of the controller 502. An example of a placement system 520 is a positioning wrist system 800 illustrated in FIG. 8.

A description of the material delivery system 100 in use is described below and illustrated in FIGS. 6A, 6B, 7A and 7B. In use, a cycle of the material delivery system 100 starts with the material (pre-preg material 620) positioned at the compaction shoe 104f of the material handling assembly 104. The material 620 is held in place to the guide surface 104d of the delivery shoe 104 via the vacuum as discussed above (602). An add (the addition of a ply of pre-preg material 602) is initiated by activating the material handling assembly actuator 112 to extend the material handling assembly 104 forward to contact the forming surface 632 of the tool 630 or an already applied material (ply) layer on the forming surface 632 of the tool 630 (604). This extension motion tacks and applies the material 602 over the forming surface of the tool 630 by trapping the material between the relatively high friction forming surface 632 (or already applied material layer on the forming surface) and the relatively low friction compaction shoe 104f of the material handling assembly 104. The head (the automated material delivery system 100) then moves forward dispensing material onto the tool (606). The material 620 is initially tacked to the tool 630 with the compaction shoe 104f until enough material 620 is paid out so that the nip roller 110 is now rolling on top of the newly started material ply 620. Once the material reaches the nip roller 110, the delivery shoe 104 is retracted away from the forming surface 632 via the material handling assembly actuator 112 of the tool (608). The material 620 is then tacked to and compacted on the forming surface 632 (or a ply layer already on the forming surface) by the nip roller 110 until a desired end of the ply is reached (610). When the end of the ply is reached, the material delivery system 100 (head) stops moving in relation to the tool (702). Once, the material delivery system 100 stops, the material remains trapped between the nip roller 110 and the tool 630 (704). Vacuum is applied to the material 620 to hold the material 620 on the material handling assembly 104 (706). The cutter assembly 108 is then activated via activating the cutting actuator 134 to sever the material 620 (708). This action severs the pre-preg material and the backing. Motion of the head 100 is then continued to tack the end (created by the cut) of the material 620 to the tool 630 (710).

Figure 8:
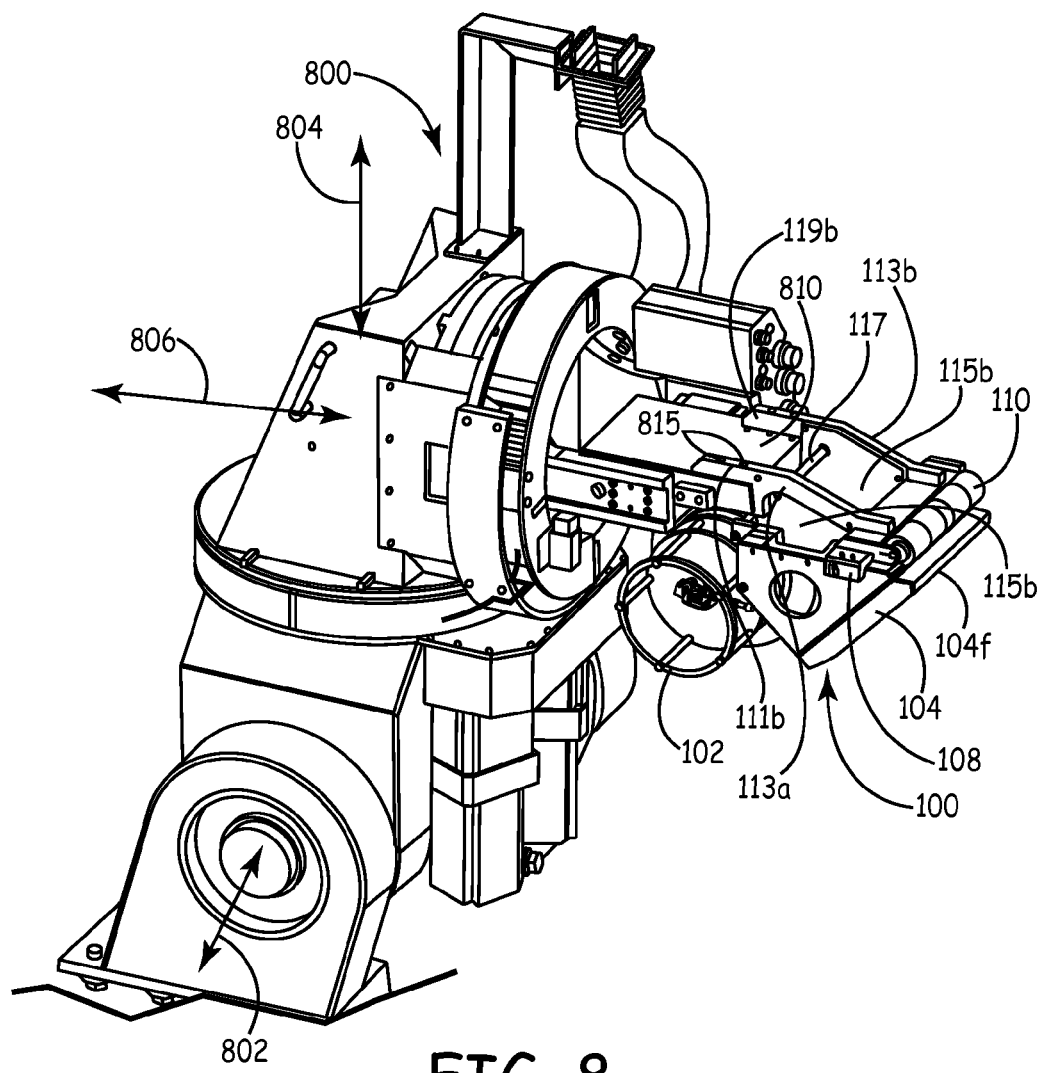
FIG. 8 is side perspective view of the material delivery system of FIG. 1 and a placement system of one embodiment of the present invention.

As discussed above, embodiments of the delivery system 100 or 200 can be coupled to a placement system 520 that positions the delivery system 100 or 200 in a desired location and orientation. For example, a placement system 520 may place the delivery system 100 in a desired location and orientation in relation to a tool 630. An example of the placement system 520 is the positioning wrist placement system 800 illustrated in FIG. 8. In this embodiment, the placement system 800 has three axes 802, 804 and 806 upon which to rotate the position of the delivery system 100 in a desired location and orientation. In addition, the placement system 800 can be mobile by being mounted on a track (not shown), or the like, to selectively move the placement system 800 towards and away from the tool 630. In the embodiment of FIG. 8, the second ends 111*b* and 119*b* of the respective first frame arm 113*a* and second frame arm 113*b* of the nip roller frame 107 of the delivery system 100 is coupled to a mounting member 810 of the placement system 800 via fasteners 815.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An automated material delivery system, the system comprising:
   a material handling assembly configured and arranged to guide material, the material handling assembly including a tacking member configured and arranged to selectively press the material over a forming surface of a tool;
   a compaction member spaced a select distance from the tacking member, the compaction member further configured to selectively press the material over at least a portion of the forming surface of the tool;
   a handling actuator coupled to selectively move at least one of the material handling assembly and the compaction member to move the material handling assembly in relation to the compaction member; and
   a cutting assembly positioned between the tacking member and the compaction member, the cutting assembly configured and arranged to selectively cut the material.

2. The system of claim 1, further comprising:
   a material spool holder configured and arranged to hold a spool of material that is supplied to the material handling assembly.

3. The system of claim 1, further comprising:
   the material handling assembly having opposed first and second ends, the tacking member being a compaction shoe located proximate the second end of the material handling assembly.

4. The system of claim 3, further comprising:
   a vacuum; and
   the material handling assembly having a plurality of vacuum ports positioned between the first and second ends of the material handling assembly, the vacuum in communication with the vacuum ports to selectively create a vacuum through the plurality of ports to hold in place material passed across the material handling assembly.

5. The system of claim 1, further comprising:
   an elongated guide coupled to the material handling assembly to direct the material to the tacking member.

6. The system of claim 1, the cutting assembly further comprising:
   a cutter; and
   a cutting actuator coupled to activate the cutter to cut the material.

7. The system of claim 1, wherein the compaction member is a nip roller.

8. The system of claim 1, further comprising:
   a roll up spool configured and arranged to collect a backing to the material.

9. A material placement assembly comprising:
   a material handling assembly base frame;
   a material spool holder configured and arranged to hold a spool of material, the material spool holder being coupled to the material handling assembly base frame;
   a material handling assembly coupled to the material handling assembly base frame, the material handling assembly configured and arranged to guide material, the material handling assembly including a tacking member configured and arranged to selectively press the material over a forming surface of a tool;
   a nip roller frame, the nip roller frame movably coupled to the material handling assembly base frame;
   a compaction member spaced a select distance from the tacking member, the compaction member further configured to selectively press the material over at least a portion of the forming surface of the tool, the compaction member coupled to the nip roller frame;
   a handling actuator coupled to selectively move at least one of the material handling assembly and the compaction member to move the material handling assembly in relation to the compaction member;
   a cutting assembly positioned between the tacking member and the compaction member, the cutting assembly configured and arranged to selectively cut the material;
   a cutting actuator configured and arranged to selectively activate the cutting assembly to cut material positioned between the tacking member and the compaction member;
   a controller in communication with the handling actuator and the cutting actuator to selectively control the handling actuator and the cutting actuator; and
   a placement system to position the material handling assembly base frame and the nip roller frame in a desired location in relation to a tool.

10. The material placement assembly of claim 9, further comprising:
    the material handling assembly further having a first end and an opposed second end, the material handling assembly also including a guide portion extending between the first end and the opposed second end, the guide portion configured and arranged to selectively engage material from the material spool holder.

11. The material placement assembly of claim 10, further comprising:
    the tacking member being positioned proximate the second end of the material handling assembly.

12. The material placement assembly of claim 10, further comprising:
    a vacuum, the vacuum in communication with the controller; and
    the guide portion of the material handling assembly including a plurality of vacuum ports, the vacuum in fluid communication with the plurality of vacuum ports in the material handling assembly to selectively create a vacuum to hold the material to the guide portion of the material handling assembly.

13. The material placement assembly of claim 10, further comprising:
a material guide rail coupled along an edge of the guide portion of the material handling assembly to further guide material being passed across the material handling assembly.

14. The material placement assembly of claim 9, further comprising:
a take up spool configured and arranged to roll up a backing portion of the material; and
a spool actuator in communication with the controller configured and arranged to rotate the take up spool.

15. The material placement assembly of claim 9, wherein the nip roller frame further comprises:
a first frame arm having a first end and a second end, the second end of the first frame arm coupled to the placement system;
a second frame arm having a first end and a second end, the second frame arm spaced a select distance from the first frame arm, the second end of the second frame arm also coupled to the placement system;
a holding bracket coupled proximate the first end of the first frame arm and proximate the first end of the second frame arm;
first and second spaced mounting plates coupling the compaction member to the holding bracket; and
the cutting assembly coupled along a length of the holding bracket.

16. The material placement assembly of claim 9, further comprising:
at least one rail receiving assembly coupled to the nip roller frame; and
a rail for each rail receiving assembly coupled to the material handling assembly base frame, each rail slidably received in an associated rail receiving assembly.

* * * * *